Figure 1:
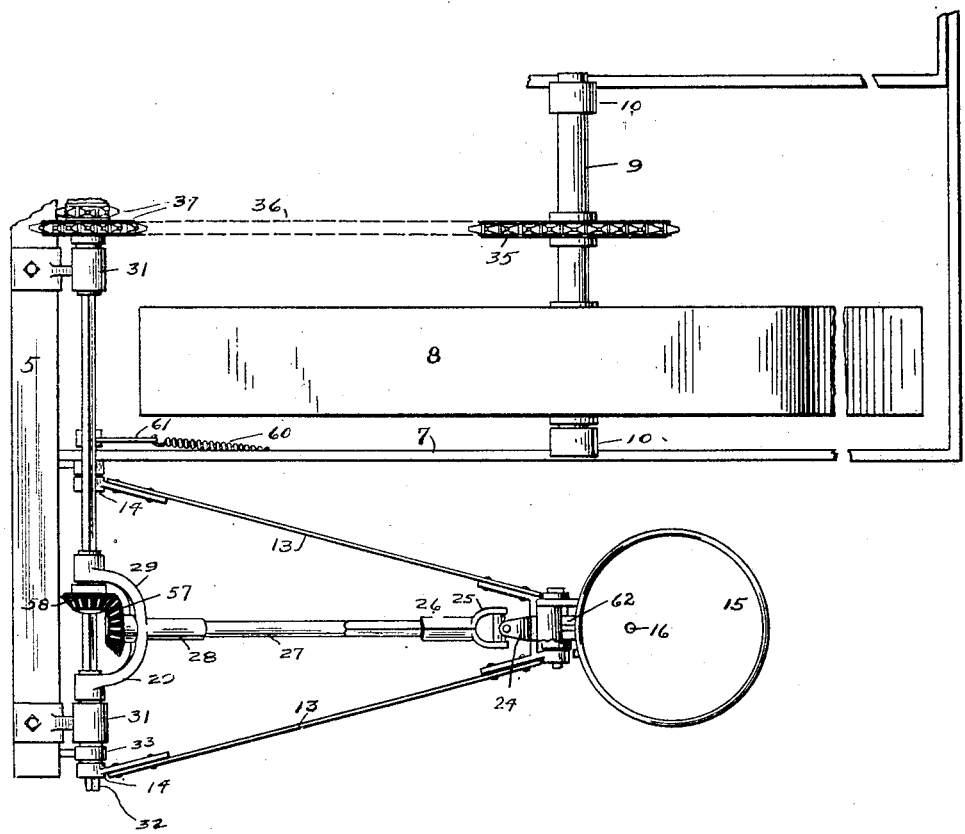

E. W. PAULSON.
SEED DISPENSER DRIVING MECHANISM FOR CORN PLANTERS.
APPLICATION FILED JAN. 20, 1919.

1,376,352.

Patented Apr. 26, 1921.
2 SHEETS—SHEET 1.

INVENTOR
E. W. PAULSON
BY
Milton S. Crandall
ATTORNEY

E. W. PAULSON.
SEED-DISPENSER DRIVING MECHANISM FOR CORN PLANTERS.
APPLICATION FILED JAN. 20, 1919.
1,376,352.
Patented Apr. 26, 1921.
2 SHEETS—SHEET 2.
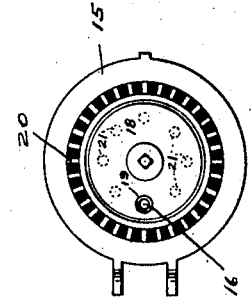
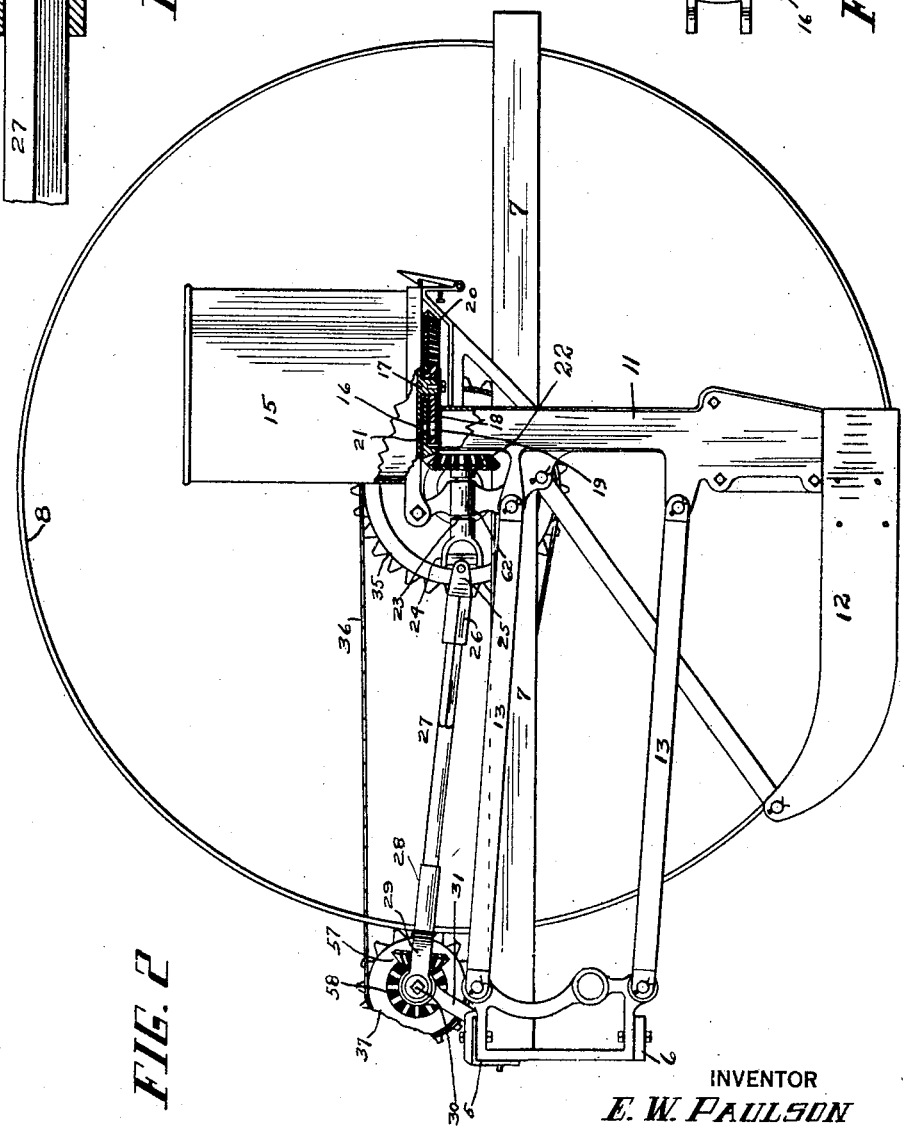
INVENTOR
*E. W. Paulson*
BY
*Milton S. Crandall*
ATTORNEY

UNITED STATES PATENT OFFICE.

ERNEST W. PAULSON, OF SIOUX CITY, IOWA, ASSIGNOR TO PERFECTION CORN PLANTER MANUFACTURING COMPANY, OF SIOUX CITY, IOWA, A CORPORATION OF SOUTH DAKOTA.

SEED-DISPENSER-DRIVING MECHANISM FOR CORN-PLANTERS.

1,376,352.   Specification of Letters Patent.   Patented Apr. 26, 1921.

Application filed January 20, 1919. Serial No. 272,199.

*To all whom it may concern:*

Be it known that I, ERNEST W. PAULSON, a citizen of the United States, and a resident of Sioux City, in the county of Woodbury and State of Iowa, have invented a new and useful Improvement in Seed-Dispenser-Driving Mechanism for Corn-Planters, of which the following is a specification.

In the corn planters presented in my United States Patents, Nos. 1,174,604 and 1,267,111, issued March 7, 1916, and May 21, 1918, respectively, the furrow-opening runners carrying the seed-dispensers are mounted for individual vertical oscillation.

Considerable difficulty has been experienced in providing a suitable driving connection between the seed-dispensers and the driving mechanism carried by the main frame, which would be unaffected by oscillation of the runners and their associated parts.

The present invention, therefore, aims primarily to provide in a corn planter having seed-dispensing elements oscillating with respect to the frame, a dependable means driven by mechanism on the frame to actuate the said elements efficiently, without affecting or being affected by the oscillation of the said elements.

Furthermore, the invention contemplates an improved driving mechanism for the seed-dispensing elements of corn planters, positive and thoroughly efficient in operation, yet simple and inexpensive in construction.

With these, and other objects in view, the invention, consisting in the construction, combination and novel arrangement of parts, will be fully understood from the following description, reference being had to the accompanying drawings, which form a part of this application, and in which like characters of reference indicate corresponding parts, throughout the several views, of which,—

Figure 1 is a fragmentary plan of a corn planter constructed in accordance with the invention; Fig. 2, is a side elevation of the same, parts being cut away; Fig. 3 is an enlarged longitudinal section of the sliding universal joint member and the shaft by which it is carried; and Fig. 4 is an inverted plan of the seed can.

Although I have illustrated and hereinafter described the preferred embodiment of the invention, I would not be understood as being limited to such embodiment specifically, for it will be clear that various alterations and modifications may be made in the details of construction and arrangement of parts without departing from the spirit and scope of the invention, as defined in the appended claims.

Referring, now, to the illustrations, the corn planter illustrated consists of a main frame having upper and lower cross members, 5 and 6, respectively, and longitudinal members, 7. The frame is carried by travel wheels, 8 (only one of which is shown), each carried by an axle, 9, journaled in bearings, 10, on the frame.

The machine is provided with a plurality of planting devices, each identical with the one shown, which consists of a seed chute, 11, carried by a suitable furrow-opening runner, 12, and supported in upright position by two superposed pairs of bars, 13, pivoted at their front ends, as at 14, to the frame, and at their rear ends to the seed-chute, whereby the planting devices are free to move vertically, relative to the frame and each other.

Above the seed chute is suitably mounted a seed container, 15, having in its bottom an opening, 16, positioned above the chute. The bottom of the container is provided with a center depending lug 17, to which is secured a disk, 18, having an opening, 19 registering with the opening, 16. Between said disk and the container is interposed a rotating element as a bevel-gear, 20, provided with equally-spaced apertures, 21, positioned to pass in registration with the openings, 16 and 19 as the gear is rotated. By virtue of this construction seeds will be admitted to the chute upon rotation of the gear, 20, the number of seeds being thus admitted being regulated by the distance of rotation of the gear which is driven by a bevel gear 22, mounted on a short shaft, 23, journaled in a suitable bearing, 62, on the chute, and carrying at its opposite end a universal joint member, 24, co-acting with a similar member, 25. The shank, 26, is suitably mounted on the shaft, 27, to turn with, and slide longitudinally upon the shaft. For this purpose I prefer that the end of the said shaft be flat-sided, and the interior of the shank, 26, correspondingly shaped. The forward end of the shaft, 27, rotates in the shank, 28 of the yoke, 29, pivoted on a transverse shaft, 30, journaled in bearings, 31, mounted on the upper frame member, 5.

The shaft, 30, is driven by a sprocket-wheel, 35, mounted on the axle, 9, and connected by a chain, 36, with a sprocket-wheel, 37, on the shaft, 30.

It is now clear that through the medium of the mechanism now described, the planting mechanisms are free to oscillate vertically, without in any way affecting, or being affected by the means which actuates and controls the seed dispensers; for when the planting mechanisms are raised and lowered, the universal joint member, 26, accordingly moves freely forwardly and rearwardly on the shaft, 27.

Having thus described my invention, what I claim as new, and desire to secure by Letters Patent of the United States, is,—

1. In a corn planter a main frame, a plurality of planting mechanisms supported thereby to oscillate vertically with respect to each other and the main frame, and each including an upright seed chute, a seed dispenser thereabove having an opening communicating with the chute, a bevel gear rotatable between the dispenser and chute, and having openings positioned to pass in registration with said first opening, to control the seeds admitted to the chute, bearings on the chutes, spindles rotatable therein, bevel gears on the rear ends of the spindles intermeshed with said first bevel gears, a transverse rotatably mounted shaft on the main frame, yokes having their arms pivoted on said shaft, longitudinally-disposed extensible shafts having their front end portions journaled in the shanks of the yokes, bevel gears on said shaft, bevel gears on the said extensible shafts driven by said latter bevel gears, universal joints between said extensible shafts and spindles, and means for rotating said transverse shaft.

2. In a corn-planter, a frame, vertically oscillating planting mechanisms supported thereby, and including seed-chutes, and seed-dispensers including actuating means, bearings on the chutes, spindles journaled therein, driving connections between the spindles and said means, a transverse rotatable shaft on the frame, bevel-gears on said shaft, yokes having their arms pivoted on said shaft, extensible shafts journaled in the shanks of the yokes, bevel-gears on the latter shafts driven by said first bevel-gears, and universal-joints between the spindles and said extensible shafts.

In testimony whereof I have hereunto set my hand this 4th day of December, 1918.

ERNEST W. PAULSON.